US005418694A

United States Patent [19]

Weigert

[11] Patent Number: 5,418,694

[45] Date of Patent: May 23, 1995

[54] GATE FOR A LAMP

[75] Inventor: Dedo A. Weigert, München, Germany

[73] Assignee: Dedo Weigert Film GmbH, Munich, Germany

[21] Appl. No.: 176,643

[22] Filed: Jan. 3, 1994

[30] Foreign Application Priority Data

Jan. 4, 1993 [DE] Germany ........................ 43 00 056.8

[51] Int. Cl.[6] ................................................ G03B 15/02

[52] U.S. Cl. ....................................... 362/18; 362/283; 362/322

[58] Field of Search ...................... 362/16, 17, 18, 278, 362/282, 283, 319, 320, 321, 322, 323, 359, 360

[56] References Cited

U.S. PATENT DOCUMENTS

| | | | |
|---|---|---|---|
| 452,638 | 5/1891 | Gartner et al. | 362/360 |
| 1,339,304 | 5/1920 | Thompson | 362/319 |
| 1,495,417 | 5/1924 | Ische et al. | 362/359 |
| 1,744,369 | 1/1930 | Dietz et al. | 362/18 |
| 2,489,172 | 11/1949 | Brandt | 362/360 |
| 4,777,566 | 10/1988 | Lowell et al. | 362/18 |

FOREIGN PATENT DOCUMENTS

| | | | |
|---|---|---|---|
| 165622 | 10/1955 | Australia | 362/323 |
| 968765 | 3/1958 | Germany | 362/16 |
| 445827 | 4/1936 | United Kingdom | 362/359 |
| 1561165 | 2/1980 | United Kingdom . | |
| 2036282 | 6/1980 | United Kingdom . | |

OTHER PUBLICATIONS

"dedolight" prospectus of the Dedo Weigert Film GmbH published in Jul. of 1989.

*Primary Examiner*—Ira S. Lazarus
*Assistant Examiner*—Alan B. Cariaso
*Attorney, Agent, or Firm*—Griffin, Butler, Whisenhunt & Kurtossy

[57] ABSTRACT

A gate for a lamp which is particularly suited for illuminating rectangular objects comprises a holding element defining a light-passage opening which can be mounted on the lamp. Four gate wings are mounted on the holding element about the light-passage opening for defining a gate opening having substantially the approximate shape of an even-leg, or isosceles, trapezoid.

8 Claims, 2 Drawing Sheets

GATE FOR A LAMP

BACKGROUND OF THE INVENTION

This invention concerns a gate for a lamp, particularly for illuminating rectangular objects, having a holding element defining a light-passage opening which is mountable on the lamp and four gate wings mountable on the holding element about the light-passage opening for defining a gate opening.

From a prospectus, "dedolight" of the Dedo Weigert Film GmbH, which was published in July of 1989, a gate for a lamp having four gate wings is known. Two of the gate wings are main wings which are mounted on opposite sides of a light-passage opening of the holding element to be pivotal about parallel first pivot axes which extend parallel to corresponding main-wing surfaces. The other two gate wings are side wings which are mounted at opposite sides of the light-passage opening, on the holding element, to be pivotal about parallel second pivot axes which extend substantially perpendicular to the first pivot axes. The second pivot axes extend parallel to planes of their corresponding side wing surfaces. It follows that by means of the four gate wings a rectangular gate opening can be shaped which, by means of pivoting the gate wings, can be varied in size. Such a gate is particularly suitable for illuminating in film and TV applications.

When illuminating a rectangular object, such as, for example, a painting in a museum, it is desired to only illuminate the object itself. Known gates are not suitable for this because they do not produce very precisely shaded silhouettes, so that their formed light right angles have "rabbit ears". If an employed lamp is placed in a flood position a slight barrel shaped (bowed) distortion is brought about along the straight length edges of the gate wings. Because of this, it is not possible to form a straight edge. Further, when illuminating paintings in museums it is usual to employ a lamp so that a light beam therefrom is directed downwardly at an angle of approximately 45°. When a rectangular gate opening is used, this results in a trapezoidal image being created on the illuminated object. Because of this, when a rectangular object is illuminated, not only the object itself is illuminated.

An object of this invention is to provide, in an uncomplicated manner, a gate for a lamp that makes possible a sharply bordered illumination of rectangular objects.

SUMMARY

According to principles of this invention, a gate opening defined by gate wings, of a general type described above for the prior art, has the general shape of an even-leg, or isosceles, trapezoid.

When a gate according to this invention is mounted on a lamp whose light is being directed downwardly at an angle, with the gate opening tapering inwardly in a downward direction, a rectangular image with sharply defined shade edges is created by the trapezoidal formed gate opening on a vertical wall.

Normally, a light beam is directed downwardly at an angle of about 45 degrees. However, other angles are also possible. The trapezoidal angle of the gate opening can be chosen according to an angle of the light beam.

In a preferred embodiment of the gate of this invention, two gate wings comprise main wing elements which are mounted on opposite sides of a light-passage opening of a holding element to pivot about parallel pivot axes, which are substantially parallel to, or in a plane of, corresponding main wing surfaces. Two other gate wings are side wings which are mounted to the holding element on opposite sides of the light-passage opening to pivot about parallel second pivot axes which extend substantially perpendicular to the first pivot axes. The trapezoidal-shaped gate opening is caused by the pivot axes of each side wing forming an angle with planes of main side wing surfaces, whereby the angles formed between the pivot axes and their respective wing surfaces are substantially the same. In this embodiment it is possible to adjust the size of the trapezoid shaped gate opening by twisting the gate side wings.

The choice of the formed angle depends on the angle of the light beam and on the size of the gate opening, which, in turn, depends on the pivoted positions of the gate wings.

When in this embodiment the angle formed between the pivot axes and the wing surfaces is adjustable, the gate can be adapted to various lamps whose light beams are to be directed downwardly at various angles.

BRIEF DESCRIPTIONS OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
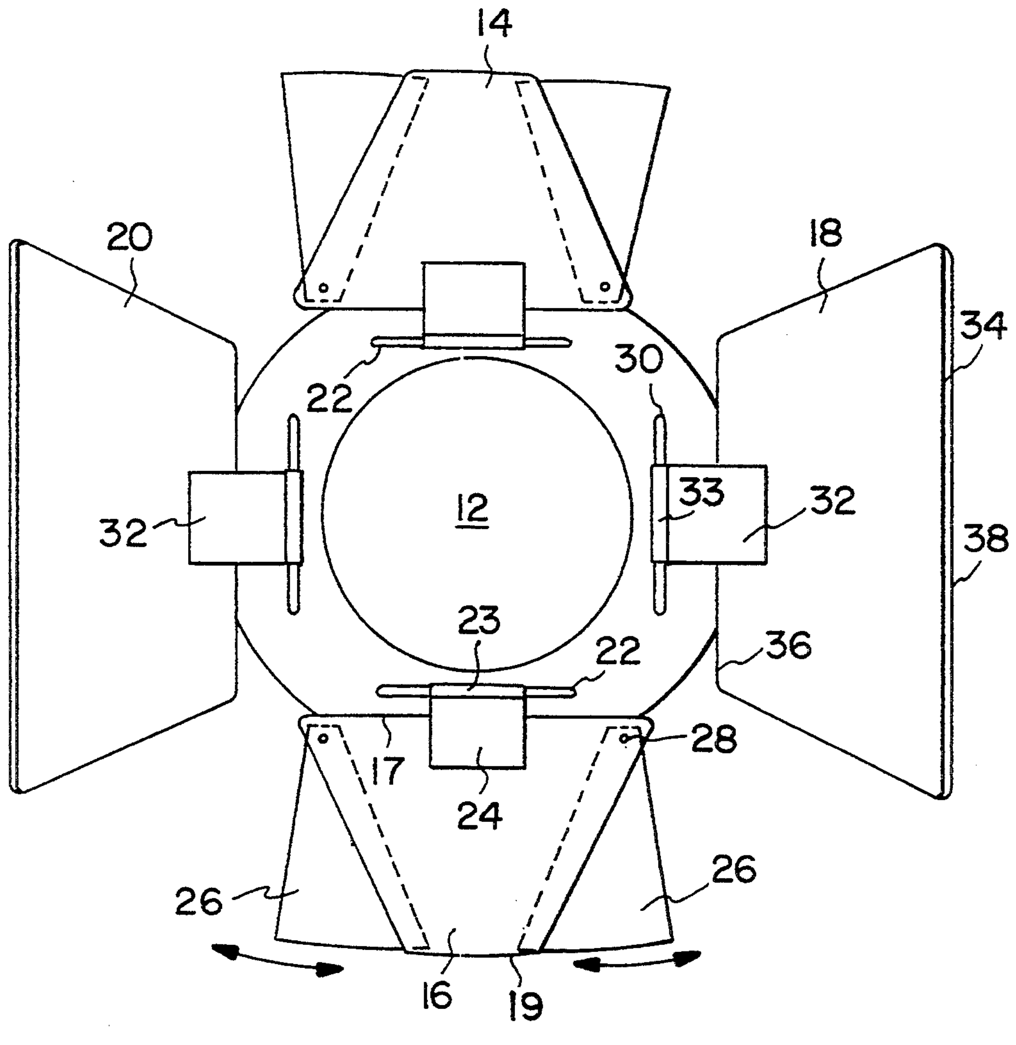
FIG. 1 is a front view of a gate of this invention with open gate wings for a lamp.
Figure 2:
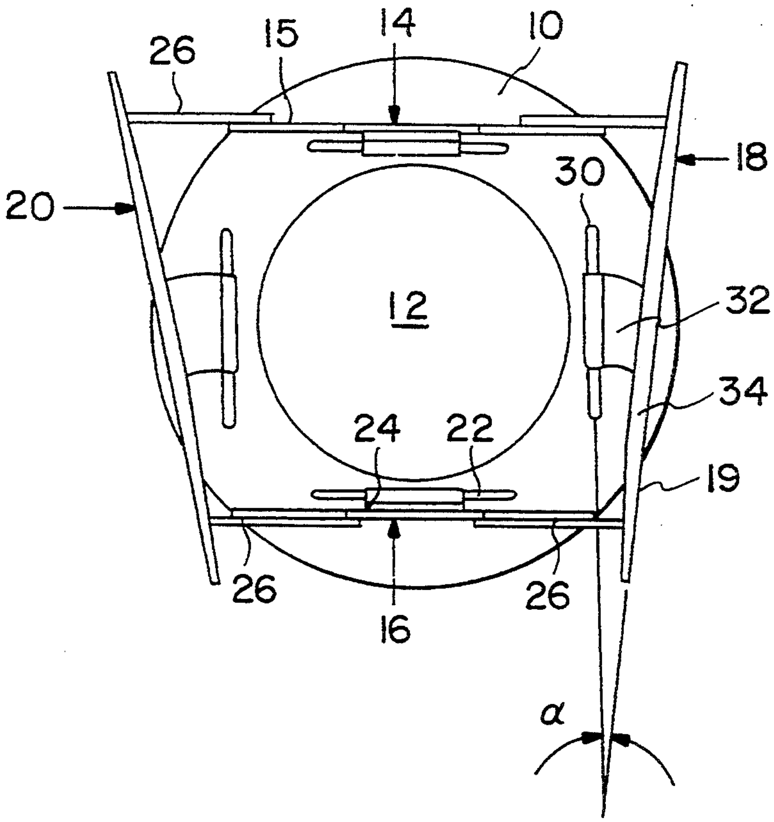
FIG. 2 is a front view of the gate of FIG. 1 with the gate wings thereof being more closed.

The gate depicted in FIGS. 1 and 2 has a ring-shaped holding element 10 with a circular-shaped light-passage opening 12. The holding element 10 is for being mounted on a lamp with the light-passage opening 12 corresponding to, or being coaxial with, a light exit of the lamp.

At diametrically opposite sides of the light-passage opening 12 parallel pivot brackets 22 are mounted on the holding element 10. Rigid, or stiff, band-shaped steering elements 24 are linked to the pivot brackets 22, each steering element 24 being provided with an eyelet, or loop 23 at its end through which the corresponding pivot bracket 22 extends. At an end of each steering element 24 opposite to the end at the pivot bracket 22, a main wing element 14, 16 is attached. The main wing elements 14, 16 have the shape of an even-leg, equal-angle, or isosceles, trapezoid. The longer length-wise edge 17 of the parallel-lengthwise edges of each main wing element 14, 16 is directed toward its respective pivot bracket 22 and extends parallel thereto. The pivot brackets 22 provide the pivot axes about which the main wing elements 14, 16 are pivotal.

An auxiliary wing 26 is linked at a linking point 28 in each corner area of the main wing elements 14, 16 near the respective pivot brackets 22. Surfaces of the auxiliary wings 26 are parallel to corresponding surfaces of main wing element surfaces 15. The widths of the auxiliary wings 26 progressively increase away from their link points 28. The length of each auxiliary wing 26 is chosen so that its edge opposite the end near the pivot bracket 22 is approximately aligned with a shorter length-wise edge 19 of the parallel length-wise edges of the main wing element 14, 16. By pivoting the auxiliary wings 26 in planes parallel to surfaces of the main wing elements 14, 16 it is possible to adjust, that is enhance, the wing surfaces of the main wing elements 14, 16.

Between the pivot brackets 22 two parallel pivot brackets 30 are mounted on diametrically opposite sides of the light-passage opening 12. The pivot axes of the pivot brackets 30 extend perpendicular to the pivot axes of the pivot brackets 22.

The arrangement of the pivot brackets corresponds to the arrangement of the pivot brackets in the known gate of the prospectus "dedolight" of the Dedo Weigert Film GmbH, which was published in July of 1989.

On each pivot bracket 30 a band shaped steering member 32 of aluminum is linked by means of an eyelet, or loop, 33 on its end through which the pivot bracket 30 extends. At an end of each steering hinge element 32, opposite the end at the pivot bracket 30, a rigid, or stiff, side wing 18, 20 is attached, for example by riveting.

Each side wing 18, 20 has the shape of an even-leg, or isosceles, trapezoid. The shorter length-wise edges 36 of the parallel length-wise edges of the side wings 18, 20, are closest to the pivot brackets 30.

Figure 3:
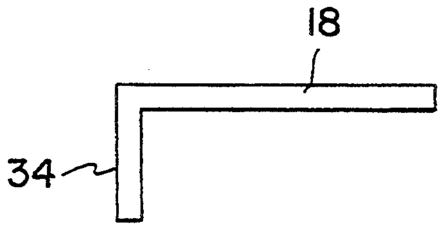
FIG. 3 is a segmented end, or edge, view of a side wing.

As is shown in FIG. 3, each side wing 18, 20, at its length-wise longer edge 38 has a flange, or tongue, 34 which extends inwardly, substantially perpendicular to main side wing surfaces, in a direction of the light-passage opening 12 when the side wings are in the FIG. 2 positions. As can be seen in FIG. 2, each flange, or tongue, 34 has a convex form, that is, it is arched in the direction of the light-passage opening 12. The arching of the flange 34 is chosen so that it compensates for a barrel-shaped distortion of a light image which would be created by a straight flange, or edge.

FIG. 1 shows the gate main wing elements and side wings 14, 16, 18 and 20 in positions in which their main wing surfaces are parallel to a front surface of the holding element 10.

FIG. 2 shows the main wing elements 14, 16 and the side wings 18, 20 in positions in which it is possible to produce a sharply defined rectangular light image on a vertical wall when the gate is on a lamp which is directed downwardly on an angle.

The side wings 18 and 20 and the main wing elements 14 and 16 are so closed that their wing surface planes intersect the holding element 10 approximately at right angles. The side wings 18, 20 are so positioned that the side wing surfaces 19 intersect the pivot axes of the pivot brackets 30 at an angle $\alpha$. The intersecting angle $\alpha$ is for each of the side wings 18, 20 approximately the same so that the gate opening defined by the wing surfaces of the main wing elements 14, 16 and the side wings 18, 20 has the form of a equal-angle, even leg, or isosceles trapezoid which tapers inwardly in a downward direction.

The size of the gate opening is adapted to an illuminated object by pivoting the gate wings 12, 14, 16, 18.

Finally, the intersecting angle $\alpha$ between the side wing surfaces 19 and the pivot axes of the pivot brackets 30 is adjusted by twisting the side wings 18 and 20 to thereby strain the steering hinge elements 32. This adjustment is made possible in that the side wings 18, 20 are linked to their pivot brackets 30 by means of flexible steering hinge elements 32 which are made of aluminum. The strength of the steering hinge elements 32 is chosen so that on the one hand the angle of intersection of the side wings 18, 20 can be adjusted and, on the other hand, the side wings 18, 20 stay in their adjusted positions once they have been adjusted thereto.

After the side wings 18, 20 have been adjusted, the size of the main wing elements 14, 16 can be enhanced, or adjusted, by pivoting the corresponding auxiliary wings 26. The auxiliary wings 26 are pivoted at their linking points 28 until they engage the side wings 18, 20.

From a construction point of view, mounting the side wings to the holding element by means of flexible aluminum bands provides a very uncomplicated possibility of adjusting the angle of intersection of the side wings with their respective pivot axes.

The aluminum bands make possible that the side wings can be twisted to provide optimum angles of intersection. They provide also, however, that the side wings stay in their adjusted positions.

If the main wing element and the side wings have trapezoidal shapes, with the longer of the parallel length-wise edges of the main wing elements and the shorter of the parallel length-wise edges of the side wings being directed toward the holding element, many gate opening sizes can be set, or adjusted.

A particularly large gate opening can be achieved if an auxiliary wing is linked in each of the corner areas of the main wings, close to the holding element.

Preferably, each side wing has on its longer length-wise edge, directed away from the holding element, a substantially perpendicular convex flange, or tongue, which is perpendicular to the main surface of the wing and is directed toward the light passage opening when wings are in the FIG. 2 position. The convex flange compensates for a barrel-shaped distortion which arises for a straight edge. At the same time, a better shading is achieved.. By means of these flanges or tongues, incidental reflected light beams reflected from preferably black wing surfaces are dampened. Further, stability of the side wings is increased.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

1. A gate for a lamp, particular for illuminating rectangular objects, comprises:

a holding element for being attached to a lamp, said holding element defining a light-passage opening;

four gate wings attached to the holding element around the light-passage opening for defining a gate opening;

mounting means for attaching the gate wings to the holding element to allow the gate wings to be positioned to form a trapezoidal gate opening;

wherein two of the four gate wings comprise main wing elements which are pivotally mounted on the holding element on opposite sides of the light-passage opening to respectively rotate about substantially parallel first pivot axes each of which may be substantially parallel to, or in a plane of, a main-wing surface of its corresponding main wing element;

wherein the other two of the four gate wings are side wings which are pivotally mounted on the holding element on opposite sides of the light-passage opening to respectively rotate about second pivot axes which are substantially perpendicular to the first pivot axes; and wherein further, each of the second pivot axes of the respective side wings can intersect with a main surface plane of its respective side wing with the angles of intersection being adjustable.

2. A gate as in claim 1 wherein the side wings are attached to the holding element by means of flexible aluminum bands.

3. A gate as in claim 1 wherein the main wing elements and the side wings are trapezoidal in shape with the longer of parallel length-wise edges of the main wing elements and shorter of parallel length-wise edges of the side wings being closest to the holding element.

4. A gate as in claim 3 wherein an auxiliary wing is linked to the main wing elements in each corner area thereof close to the holding element.

5. A gate as in claim 3 wherein along each longer length-wise edge of the side wings, which is positioned away from the holding element, there is a convex tongue which extends approximately perpendicular to a main surface of the side wing in the direction of the light opening.

6. A gate as in claim 2 wherein the main wing elements and the side wings are trapezoidal in shape with the longer of parallel length-wise edges of the main wing elements and shorter of parallel length-wise edges of the side wings being closest to the holding element.

7. A gate as in claim 4 wherein along each longer length-wise edge of the side wings, which is positioned away from the holding element, there is a convex tongue which extends approximately perpendicular to a main surface of the side wing in the direction of the light opening.

8. A gate as in claim 1 wherein at least the mounting means for the side wings allows each of said side wings to rotate about an axis parallel to an axis of a light beam passing from the lamp through the light-passage opening when the main surface plane of the side wing is substantially perpendicular to the holding element.

* * * * *